United States Patent
Higuma et al.

(10) Patent No.: US 7,768,696 B2
(45) Date of Patent: Aug. 3, 2010

(54) THZ WAVE GENERATOR

(75) Inventors: Kaoru Higuma, Tokyo (JP); Junichiro Ichikawa, Tokyo (JP); Shingo Mori, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 250 days.

(21) Appl. No.: 11/547,342

(22) PCT Filed: Mar. 24, 2005

(86) PCT No.: PCT/JP2005/005327

§ 371 (c)(1),
(2), (4) Date: Oct. 8, 2008

(87) PCT Pub. No.: WO2005/098530

PCT Pub. Date: Oct. 20, 2005

(65) Prior Publication Data

US 2009/0052013 A1 Feb. 26, 2009

(30) Foreign Application Priority Data

Mar. 31, 2004 (JP) ............... 2004-104239

(51) Int. Cl.
*G02F 2/00* (2006.01)
*H01S 4/00* (2006.01)
(52) U.S. Cl. .................. 359/333; 359/239; 359/330
(58) Field of Classification Search ............. 359/239, 359/330, 333
See application file for complete search history.

(56) References Cited

U.S. PATENT DOCUMENTS 6,563,622 B2 * 5/2003 Mueller et al. ............. 398/182

(Continued)

FOREIGN PATENT DOCUMENTS

JP 8-160475 6/1996

(Continued)

OTHER PUBLICATIONS

Yamanaka et al, "A multi-wavelength light source using an optical single-side band modulator and an arrayed waveguide grating", Lasers and Electro-Optics, 2003. CLEO/Pacific Rim , F2A-(8)-5, 2003.*

(Continued)

*Primary Examiner*—Eric Bolda
(74) *Attorney, Agent, or Firm*—Chapman and Cutler LLP

(57) ABSTRACT

The present invention purposes to provide a THz-wave generator capable of generating a THz-wave stably and efficiently, and particularly, to provide the THz-wave generator which is stable against a frequency shift of a laser source and which can easily vary the frequency of the THz-wave.

A THz-wave generator, for inputting a laser beam from a light source unit A including a laser source to a THz-wave generating element D, and generating a THz-wave ($f_T$) from the THz-wave generating element, wherein a light circulating unit including an SSB optical modulator, and wavelength selecting means C are disposed between the laser source A and the THz-wave generating element D, the laser beam is guided into the light circulating unit, a specific wavelength lightwave is selected out of lightwaves having a plurality of wavelengths generated in the light circulating unit by the wavelength selecting means, and the specific wavelength ($f_0$, $f_n$) lightwave is input to the THz-wave generating element.

10 Claims, 5 Drawing Sheets

U.S. PATENT DOCUMENTS

| | | | |
|---|---|---|---|
| 6,697,186 | B2 | 2/2004 | Kawase et al. |
| 2002/0090164 | A1 | 7/2002 | Endo et al. |

FOREIGN PATENT DOCUMENTS

| | | |
|---|---|---|
| JP | 2002-072269 | 3/2002 |
| JP | 2002-162659 | 6/2002 |

OTHER PUBLICATIONS

Higuma, K., et al., X-cut LiNbO3 Optical SSB-SC Modulator, Technical Report 2002, Advanced Materials and Opto-Electronics, Sumitoma Osaka Cement Co., Ltd., Dec. 8, 2001, pp. 15-19.

Taniuchi, T., et al., Widely Tunable Teraherz Electromagnetic Radiation by Nonlinear Optical Effect, The Review of Laser Engineering, vol. 30, No. 7, Jul. 15, 2002, pp. 365-369 (with English abstract).

Takada. A., et al., Wavelength Converter Operating on strict Frequency Grid Using a Single Side Band Optical Modulator in a Circulating Loop, Technical Digest, Optical Fiber Communication Conference and Exposition 2003, vol. 2, pp. 769-770.

Kurokawa, T., et al., A Multi-Wavelength Light Source Using Optical SSB Modulator and AWG, Lecture Handbook, The Japan Society of Applied Physics, 64th Autumn Meeting, 2003, p. 1074.

\* cited by examiner

THZ WAVE GENERATOR

TECHNICAL FIELD

The present invention relates to a THz (terahertz) wave generator, and particularly, to a THz-wave generator which generates a THz-wave by inputting a laser beam from a light source unit including a laser source to a THz-wave generating element.

RELATED ART

A THz (terahertz) wave is an infrared ray having a wavelength of 30 µm to 300 µm and an ultrahigh frequency electromagnetic wave having a frequency higher than 1 THz.

The THz-wave is expected to be widely used in the fields of basic science, engineering, medicine, and biotechnology. For example, in the fields of basic science, the THz-wave is used for a structure analysis of physical and chemical materials using a spectroscopy, a discovery of interstellar materials by radiowave and infrared astronomical spectroscopy science, and the like. In the field of engineering, the THz-wave is used for a THz-wave ultrahigh-speed communication (cosmic space communication and the like), a geoenvironmental sensing (a detection of various gases and environmental materials, etc.), an assessment of a free electron density and mobility of a semiconductor material, an assessment of an dielectric property of a dielectric-functional material, a three-dimensional structure assessment of an organic-functional polymer, and an internal check of an electronic package. Further, in the fields of medicine and biotechnology, the THz-wave is used for an analysis in a structure of a biological-functional protein, an imaging of functions of body tissues, and the analysis of a structure of a medication (opaque powder base).

As a method of generating the THz-wave, a method using a difference frequency generation (DFG) shown in FIG. 1A or a method using a parametric oscillation shown in FIG. 1B is known.

In the method using the difference frequency generation, by using a nonlinear optical crystal (referred to as a DFG crystal) formed of $LiNbO_3$, GaAs, organic DAST (4-dimethylamino-N-methyl-4-stilbazolium tosylate) and the like as a THz-wave generating element, two lightwaves having different frequencies are input to the THz-wave generating element, and the THz-wave is generated by using a difference frequency wave having a difference frequency between the two lightwaves.

In this difference frequency generating method, two light sources having different frequencies ($\omega_1$, $\omega_2$) are required. Moreover, it is necessary to keep a difference in frequency between both light sources constant in order to stably generate a THz-wave ($\omega_3 = \omega_2 - \omega_1$). Therefore, frequencies (wavelengths) of the lightwaves generated from the two light sources needs to be maintained and controlled in a predetermined value with high precision.

Even if the frequency of the THz-wave is varied by setting one of the two light sources as a wavelength-variable light source, a variation precision of the frequency of the wavelength-variable light source is approximately 1 GHz, so that the frequency control of the THz-wave is limited.

On the other hand, in the method using the parametric oscillation, as disclosed in Patent Document 1, the nonlinear optical crystal as the THz-wave generating element is disposed in a resonator, and one lightwave having a predetermined frequency ($\omega_1$) is input to the THz-wave generating element, thereby generating the THz-wave ($\omega_3$, $\omega_1 = \omega_2 + \omega_3$) corresponding to a difference between the frequency of an incident lightwave and a resonant frequency ($\omega_2$) in the resonator by a parametric effect. Patent Document 1: Japanese Unexamined Patent Application Publication No. 2002-72269

In this parametric oscillation method, it is advantageous that only one light source is required in comparison to the difference frequency generating method, but the frequency (wavelength) of the lightwave generated from the light source still needs to be maintained and controlled in the predetermined value with high precision. Furthermore, the resonance efficiency needs to be highly maintained in the resonator, and a location and a shape of a reflective member (HR mirror) constituting the resonator needs to be maintained and controlled with high precision.

DISCLOSURE OF THE INVENTION

Problems to be Solved by the Invention

To solve the problems as described above, the present invention is to provide a THz-wave generator capable of generating a THz-wave stably and efficiently, and particularly, to provide a THz-wave generator which is stable against a frequency shift of a laser source and which can easily vary the frequency of the THz-wave.

Means for Solving the Problems

According to a first aspect of the invention, there is provided a THz-wave generator, for inputting a laser beam from a light source unit including a laser source to a THz-wave generating element, and generating a THz-wave from the THz-wave generating element, wherein, a light circulating unit including an SSB optical modulator, and wavelength selecting means are disposed between the laser source and the THz-wave generating element, the laser beam is guided into the light circulating unit, a specific wavelength lightwave is selected out of lightwaves having a plurality of wavelengths generated in the light circulating unit by the wavelength selecting means, and the specific wavelength lightwave is input to the THz-wave generating element.

According to a second aspect of the invention, in the THz-wave generator according to the first aspect, the light source unit emits a single wavelength lightwave from a single-mode laser source.

According to a third aspect of the invention, in the THz-wave generator according to the first or second aspect, the wavelength selecting means selects any wavelength.

According to a fourth aspect of the invention, in the THz-wave generator according to any one of the first to third aspects, the light circulating unit has an optical amplifier.

According to a fifth aspect of the invention, in the THz-wave generator according to any one of the first to fourth aspects, the optical amplifier is disposed between the wavelength selecting means and the THz-wave generating element.

ADVANTAGES OF THE INVENTION

According to the first aspect of the invention, a specific wavelength light transmitted from the laser source is repetitively passed through the SSB optical modulator in the light circulating unit including the SSB optical modulator, and therefore, it is possible to generate continuous light of plural wavelengths having a fixed frequency interval precisely controlled.

Moreover, the wavelength selecting means separates a lightwave having a required wavelength from lightwaves in which a plurality of wavelengths is mixed and outputs the lightwave separatively.

Therefore, the lightwaves having constantly stable different frequencies can be input to the THz-wave generating element and the THz-wave can be stably generated.

Even when the wavelength of the laser source is varied, the frequency of the lightwave generated by the SSB optical modulator is determined by the frequency of a modulation signal applied to the SSB optical modulator and, consequently, a frequency difference of both lightwaves of different frequencies selected by the wavelength selecting means shows a constant fixed value Thus, a constantly stable THz-wave can be generated.

When the frequency of the THz-wave is varied, the frequency of the THz-wave can be easily adjusted by using a method of varying the wavelength selected by the wavelength selecting means or a method of varying the frequency of the modulation signal applied to the SSB optical modulator.

According to the second aspect of the invention, in the light source unit which comprises a single wavelength light transmitted from a single-mode laser source, the number of components constituting the THz-wave generator can be reduced. Therefore, the entire THz-wave generator can be simplified and a manufacturing cost can be reduced.

According to the third aspect of the invention, the wavelength selecting means can select any wavelength, so that the frequency of the THz-wave can be optionally adjusted in a simple configuration.

According to the fourth aspect of the invention, in the light circulating unit having the optical amplifier, the attenuation of the light intensity of a side band spectrum generated in the SSB optical modulator can be compensated. That is, even when the lightwave having the plural wavelengths by the SSB optical modulator is generated from a specific wavelength by a laser beam, the light intensity of the lightwave input to the THz-wave generating element can be maintained at a predetermined value or more due to a constant increase in light intensity by the optical amplifier.

According to the fifth aspect of the invention, since the optical amplifier is disposed between the wavelength selecting means and the THz-wave generating element, a plurality of light intensities input to the THz-wave generator can be enhanced. That is, the light intensity of the THz-wave to be output can be enhanced by enhancing the input light previously, because the intensity of the THz-wave output from the THz-wave generating element depends on the intensity of input light.

DESCRIPTION OF REFERENCE NUMERALS AND SIGNS

A: Light Source Unit
B: Light Circulating Unit
C: Output Unit
101: Single-mode Laser
102: Isolator
103: Polarization Controller
104: Optical Coupler
105: SSB Optical Modulator
106: Signal Generator
107: Optical Amplifier
108: Isolator
109: Optical Filter
115: Polarization Controller

BEST MODES FOR CARRYING OUT THE INVENTION

Figure 1:
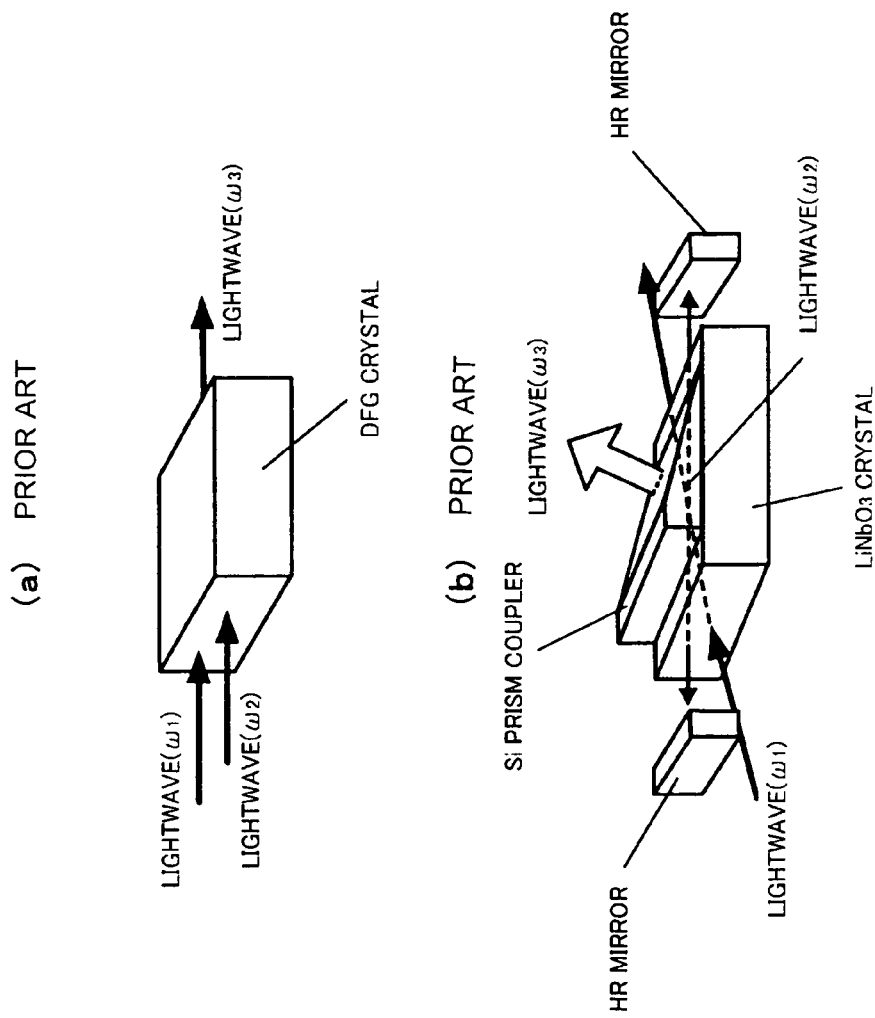
FIG. 1 shows a generation principle of a THz-wave.
Figure 2:
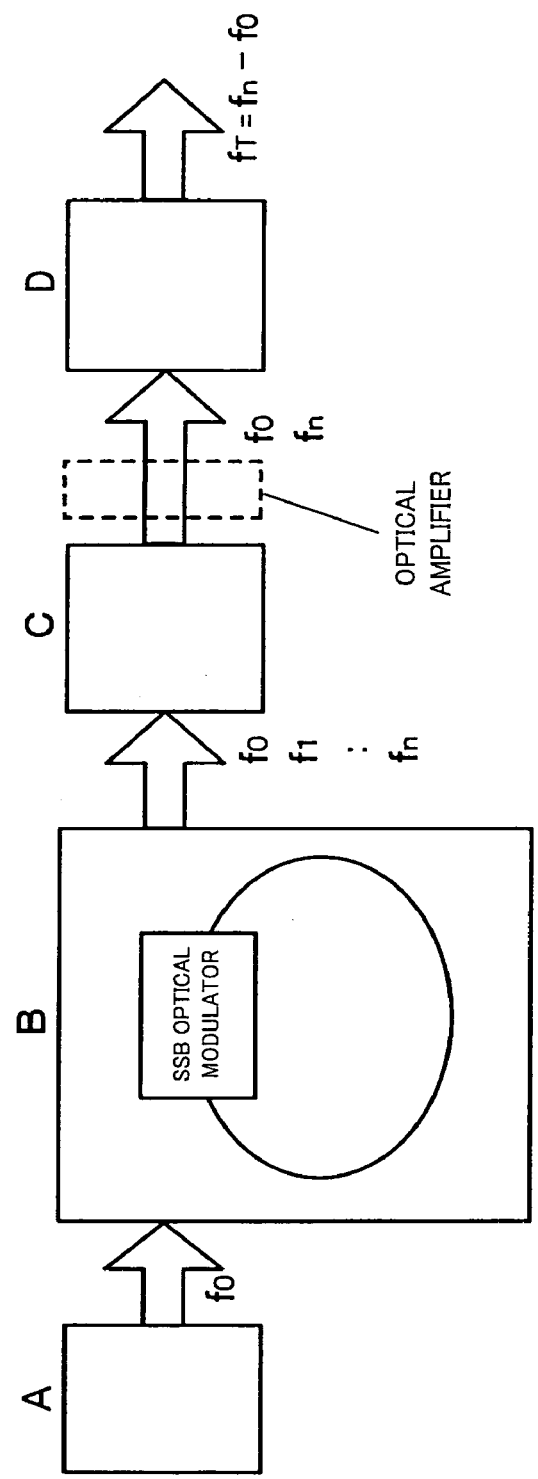
FIG. 2 is a basic conceptual view of a THz-wave generator according to the invention.

FIG. 2 is a basic conceptual view of a THz-wave generator according to an embodiment of the present invention.

The THz-wave generator includes a light source unit A which transmits a lightwave having a specific wavelength like a laser source, a light circulating unit B in which a circulating optical path is formed by the transmitted lightwave and a single side band (SSB) optical modulator is provided on the circulating optical path, wavelength selecting means C selecting a specific wavelength out of lightwaves including plural wavelengths, and a THz-wave generating element D emitting the lightwave (THz-wave) having a same frequency ($f_T = f_n - f_0$) as a difference in frequency of two lightwaves by inputting the two lightwaves having different frequencies (frequencies $f_0$, $f_n$).

In the light source unit A, continuous light of plural wavelengths having a fixed frequency interval controlled precisely can be generated by a side band spectrum generated by the SSB optical modulator described below, which requires only one single-mode laser source.

In the light source unit A, an isolator can be disposed on the optical path of the emitted light so that a laser beam is not re-input to the laser source, or a polarization controller can be disposed on the optical path of the laser beam so that a polarization surface of the lightwave emitted from the light source unit A is adjusted.

Next, the single side band (SSB) optical modulator used in the light circulating unit B will be described.

Figure 3:
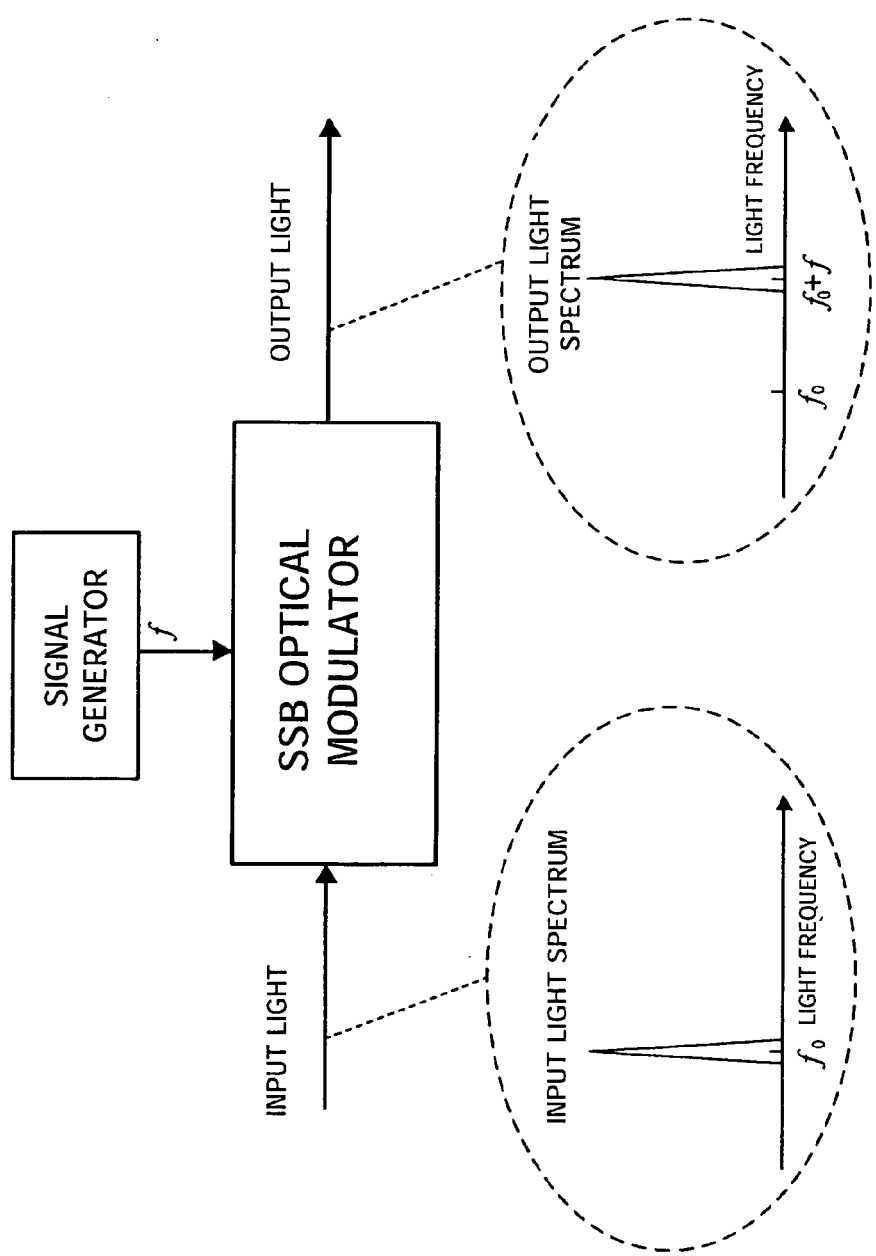
FIG. 3 shows operation conditions of an SSB optical modulator.

FIG. 3 shows an operation of the SSB optical modulator.

As specifically described in Non-patent Document 1 described below, the SSB optical modulator operates with a microwave applied from a general signal generator.

For example, when the frequency of the microwave is set to f, the frequency of the light input to the SSB optical modulator is shifted by f. As shown in FIG. 2, the frequency $f_0$ of the incident light is varied to the frequency $f_0+f$ of the output light after passing through the SSB optical modulator. The output light is referred to as the side band spectrum.

As described above, the SSB optical modulator operates as a light frequency shifter.

When the microwave is applied to the SSB optical modulator by another way, the frequency of the output light may shift to a minus direction like $f_0-f$. [Non-patent Document 1] 'Optical SSB-SC Modulator Using X-cut LiNbO$_3$', Higuma Kaoru et. al., 'Sumitomo Osaka Cement Technical Report 2002', P17~21, issued by the New Technology Research Center of Sumitomo Osaka Cement Co., Ltd., Dec. 8, 2001.

In the light circulating unit B, the transmitted lightwave moves in a circle shape by using optical components such as an optical fiber, a waveguide formed on a substrate, lens, a mirror or the like and the SSB optical modulator is disposed on the circulating optical path.

Figure 4:
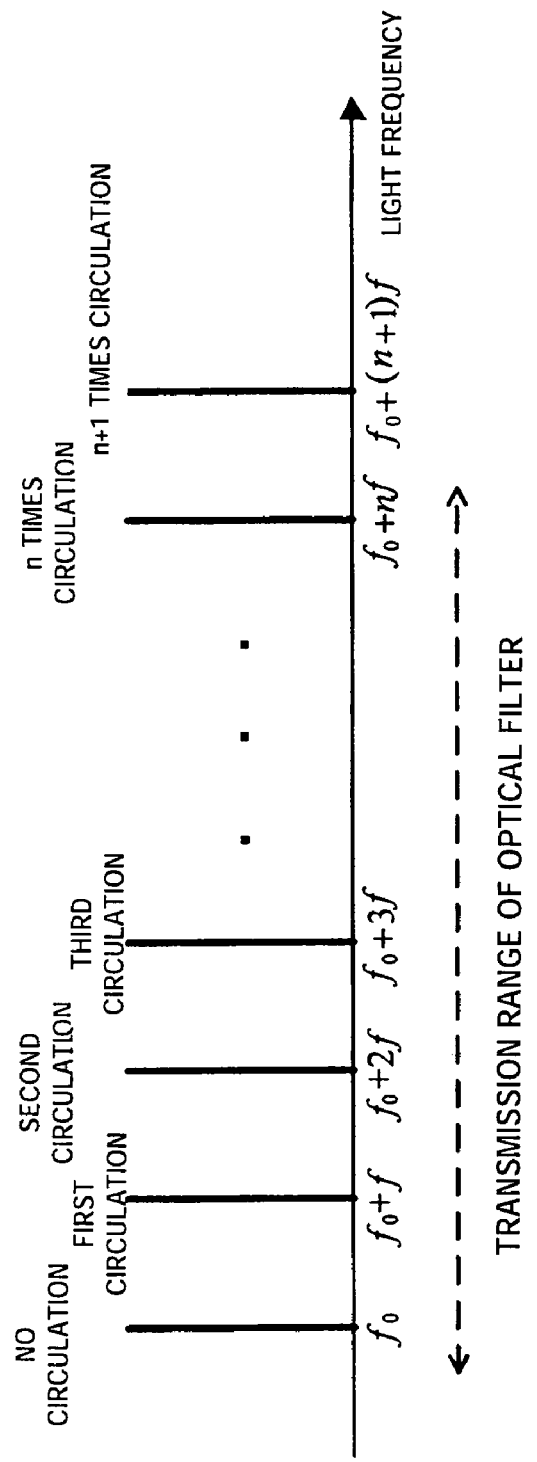
FIG. 4 shows a status of a multiplewavelength light generated in a light circulating unit.

In the light circulating unit B, as shown in FIG. 4, when the frequency of the lightwave firstly transmitted to the light circulating unit is set to $f_0$ (no circulation), the frequency (a first circulation) passing through the SSB optical modulator at a first time is set to $f_0+f$. Similarly, a second frequency and a third frequency are set to $f_0+2f$ and $f_0+3f$, respectively, thereby generating the lightwave having plural wavelengths by a same frequency interval f.

In the light circulating unit B, the lightwaves having specific wavelengths are continuously transmitted from the light source unit A, and thus, the lightwaves having the plural wavelengths shown in FIG. 4 exist on the optical path of the light circulating unit B.

In general, the side band spectrum generated by the SSB optical modulator is lower than the lightwave input to the SSB optical modulator in light intensity. Accordingly, the optical amplifier is disposed on the circulating optical path of the light circulating unit B, so that a reduction in light intensity of the side band spectrum is compensated and the light intensity which can be used as a multiplewavelength light source is secured.

Furthermore, an optical filter can be formed on the circulating optical path of the light circulating unit B in accordance with the wavelength of the lightwave selected by the wavelength selecting means.

A range of the transmitted wavelength of the optical filter is conformed to a wavelength range which can be divided by a wave dividing element, and the wavelength of the lightwave circulating through the light circulating unit is restricted, so that a noise involved in the lightwave finally emitted from the multiplwavelength light source can be suppressed without generating lightwaves in the range other than a desired wavelength range, as shown in FIG. 4.

The isolator for preventing the lightwave re-input to the SSB optical modulator from an inverse direction, or the polarization controller for controlling the polarization surface of the lightwave to enhance a modulation efficiency of the SSB optical modulator can be disposed on the circulating optical path of the light circulating unit B.

Next, the wavelength selecting means C will be described.

A dielectric filter formed of a dielectric film, a fiber bragg grating (FBG) and the like which can select a specific wavelength can be used as the wavelength selecting means without a particular restriction. The wavelength selecting means may be a fixing type which can select a fixed wavelength, but a variable type which can select any wavelength, for example, etalon filter or diffraction grating, may be used.

A THz-wave generating element using a difference frequency generation described above is very suitable for the THz-wave generating element. In detail, a nonlinear optical crystal such as $LiNbO_3$, GaAs, organic DAST and the like is used.

The THz-wave generating element generates the THz-wave having a frequency corresponding to a difference in frequency of the two lightwaves by inputting the two lightwaves having different frequencies to the nonlinear optical crystal.

Next, the optical coupling method of the light source unit A and the light circulating unit B, or the light circulating unit B and the wavelength selecting means C or the THz-wave generating element will be described.

An optical coupler which is well known in the art can be used for the optical coupling method.

Especially, in order to accomplish a reduction in manufacturing cost or a compactification of the entire generator, it is preferable to reduce the number of used optical components by using both the optical coupler which couples the light source unit and the light circulating unit, and the optical coupler which couples the light circulating unit and the wavelength selecting means or the THz-wave generating element.

A specific example will be described below, but an optical fiber coupler or a combination of an optical circulator and the fiber bragg grating can be used as the optical coupler.

Since the SSB optical modulator used in the light circulating unit B has a polarization dependency, it is preferable to properly adjust the state of polarization in the optical coupling of the light source unit A and the light circulating unit B or the light circulating unit B and the wavelength selecting means C, and the optical coupling of each optical component in the light circulating unit.

Therefore, in the couplings described above, it is possible to use a method of using the single-mode optical fiber and forming the polarization controller in the light source unit A and the light circulating unit B or a method of using a polarization maintaining optical fiber and using the optical coupler having a polarization maintaining function.

Next, the optical amplifier to be located between the wavelength selecting means C and the THz-wave generating element D will be described.

Means capable of amplifying light of a used wavelength can be used as the optical amplifying means without a particular restriction. However, when an element using the difference frequency generation is used as the THz-wave generating element, it is suitable to use the amplifier capable of amplifying the two lightwaves having different frequencies for generating the difference frequency. Since the intensity of the THz-wave output in the difference frequency generating THz-wave generating element is proportional to the product of the intensities of the two lightwaves having the different frequencies, the intensities of the two lightwaves are amplified to enhance the intensity of the output THz-wave. For example, since erbium-doped fiber amplifier (EDFA) generally used in an optical communication has an optical amplification function in a wide range of 1.55 μm in frequency, it is suitable to use the EDFA.

Figure 5:
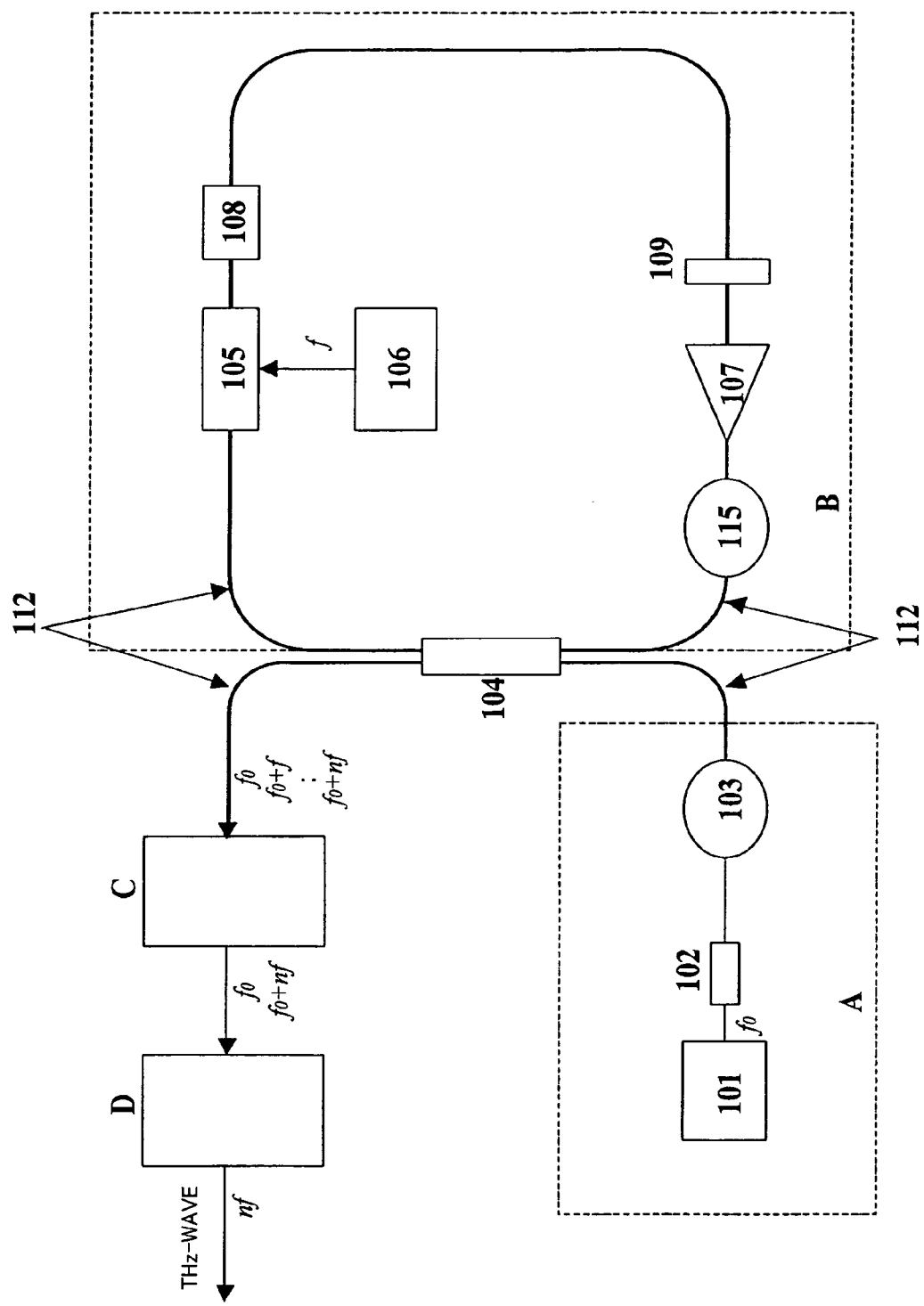
FIG. 5 shows an embodiment according to the invention.

FIG. 5 shows one embodiment as a specific example.

The THz-wave generator according to the embodiment shown in FIG. 5, includes four parts such as the light source unit A, the light circulating unit B, the wavelength selecting means C and the THz-wave generating element D. Particularly, the light source unit A, the light circulating unit B and the wavelength selecting means C are coupled by an optical coupler 104.

The light source unit A includes a single-mode laser 101 emitting single wavelength light, an isolator 102 and a polarization controller 103. The isolator 102 is provided to prevent back reflection from returning to a laser. The laser beam is guided into the light circulating unit B by the optical coupler 104.

The light circulating unit B includes an SSB optical modulator 105, an isolator 108, an optical filter 109, an optical amplifier 107, a polarization controller 115 and a single-mode optical fiber 112 or the polarization maintaining fiber coupling them. When the polarization maintaining fiber is used, the polarization controller is not required.

The SSB optical modulator 105 is driven by a microwave frequency signal f from a signal generator 106.

The wavelength selecting means C is connected to the optical coupler 104 disposed in the light circulating unit B and a portion of the lightwave passing through the light circulating unit is derived to the wavelength selecting means.

The lightwave passing through the wavelength selecting means C is guided into the THz-wave generating element D. The optical amplifier using an optical surge is formed between the wavelength selecting means C and the THz-wave generating element D, so that the lightwave selected by the wavelength selecting means C can be amplified.

Next, the operation of the THz-wave generator according to the embodiment shown in FIG. 5 will be described.

Light emitted from the single-mode laser 101 of an oscillation frequency $f_0$ passes through the isolator 102 and is properly polarized by the polarization controller 103, and is divided to an optical loop of the light circulating unit B side and the wavelength selecting means C using the optical coupler 104. By adjusting the branching ratio of the light circulating unit B and the wavelength selecting means C, the light intensity of the respective wavelengths, particularly, the frequency $f_0$ and the other frequency ($f_0+f$) can be adjusted.

When the wavelength selecting means C selectively transmits only the lightwave having two frequencies of $f_0$ and ($f_0+nf$), light of the frequency $f_0$ input to the wavelength selecting means C passes through the wavelength selecting means and is input to the THz-wave generating element D.

On the other hand, the SSB optical modulator 105 in the optical loop is driven by the signal generator 106 with a modulation frequency f. Therefore, the light input to the optical loop with frequency $f_0$ is shifted by the frequency f by the SSB modulator and is converted to light of the frequency of ($f_0+f$).

The frequency-converted light passes through the isolator 108 and the optical filter 109. The frequency-converted light is amplified by the optical amplifier 107 and is properly polarized by the polarization controller 115, circulating through the optical loop. A portion of the lightwaves is branched to the wavelength selecting means C by the optical coupler 104 and the other portion circulate through the optical loop again.

The frequency-converted light branched to the wavelength selecting means C has a frequency of ($f_0+f$), thereby being blocked by the wavelength selecting means C.

The frequency-converted light re-input to the optical loop is converted to the light having a frequency of ($f_0+2f$) again with a frequency shift by the SSB optical modulator 105. After the frequency-converted ($f_0+2f$) light is amplified again, a portion of the frequency-converted ($f_0+2f$) light is branched to the wavelength selecting means C by the optical coupler 104 and blocked by the wavelength selecting means C.

The other portion circulates through the optical loop and is converted to a frequency of ($f_0+3f$).

By the repetition of the operations described above, when the light circulates through the optical loop at n times (n is an integer of 1 or more), the light is converted to a frequency of ($f_0+nf$). The portion branched to the wavelength selecting means C passes through the wavelength selecting means C and is input to the THz-wave generating element D similarly to the lightwave of the frequency $f_0$.

After then, the light re-guided to the optical loop is converted to a frequency of ($f_0+(n+1)f$), but the light cannot pass through the optical filter 109, so the circulation is finished. This is because the light having a frequency of $f_0+nf$ or less can pass through the optical filter 109, but the light having a frequency of $f_0+(n+1)f$ or more cannot pass through the optical filter 109, as shown in FIG. 3.

When the light circulates through the optical loop more than n times, light having a frequency of more than ($f_0+nf$) is generated and becomes a noise in the THz-wave generator.

The selection of a specific wavelength may be performed by the wavelength selecting means C and in combination with the optical filter 109 as described above.

As a result of the operation described above, since light is transmitted to the loop as continuous light from the single-mode laser, only the lightwaves having frequencies of $f_0$ and ($f_0+nf$) are emitted from the wavelength selecting means C.

The two lightwaves are input to the THz-wave generating element D and a THz-wave having a frequency nf corresponding to the difference between the two frequencies is output from the THz-wave generating element D.

The case that the frequency of light is enhanced by the SSB optical modulator was described above, but the frequency of light can be lowered by a setting method of the SSB optical modulator or an applying method of a modulation signal. In this case, the same operation can be performed.

As described above, the lightwaves having the frequencies of $f_0$ and ($f_0+nf$) emitted from the wavelength selecting means C are input directly to the THz-wave generating element D, but the optical amplifier can be formed between the wavelength selecting means C and the THz-wave generator D and the light intensity of the emitted THz-wave thereby can be also enhanced.

INDUSTRIAL APPLICABILITY

As described above, the present invention provides a THz-wave generator capable generating a THz-wave stably and efficiently, and particularly, provides the THz-wave generator which is stable against a frequency shift of a laser source and which can easily vary the frequency of the THz-wave.

What is claimed is:

1. A THz-wave generator, comprising
a light source unit;
a light circulating unit comprising an SSB optical modulator;
wavelength selecting means; and
a THz-wave generating element, wherein
the light circulating unit and wavelength selecting means are disposed between the light source unit and the THz-wave generating element,
the light source unit is arranged to emit a laser beam that is guided into the light circulating unit,
the light circulating unit is configured to circulate said laser beam through the SSB optical modulator and to generate lightwaves having a plurality of wavelengths,
the wavelength selecting means is configured to select two specific wavelength lightwaves out of said lightwaves having a plurality of wavelengths generated in the light circulating unit,
the wavelength selecting means is arranged to input the two specific wavelength lightwaves into the THz-wave generating element, and
the THz generating unit is configured to generate a THz-wave.

2. The THz-wave generator according to claim 1, wherein the light source unit emits a single wavelength lightwave from a single-mode laser source.

3. The THz-wave generator according to claim 1, wherein the wavelength selecting means selects two different specific wavelength lightwaves for a difference in frequency of the two different specific lightwaves corresponding to a frequency of the THz wave.

4. The THz-wave, generator according to claim 1, wherein the light circulating unit comprises an optical amplifier.

5. The THz-wave generator according to claim 4, wherein the optical amplifier is disposed between the wavelength selecting means and the THz-wave generating element.

6. The THz-wave generator according to claim 2, wherein the wavelength selecting means selects two different specific wavelength lightwaves for a difference in frequency of the two different specific lightwaves corresponding to a frequency of the THz-wave.

7. The THz-wave generator according to claim 2, wherein the light circulating unit comprises an optical amplifier.

8. The THz-wave generator according to claim 3, wherein the light circulating unit comprises an optical amplifier.

9. The THz-wave generator according to claim 7, wherein the optical amplifier is disposed between the wavelength selecting means and the THz-wave generating element.

10. The THz-wave generator according to claim 8, wherein the optical amplifier is disposed between the wavelength selecting means and the THz-wave generating element.

* * * * *